(12) United States Patent
Buchwald

(10) Patent No.: US 12,553,757 B2
(45) Date of Patent: Feb. 17, 2026

(54) SYSTEMS AND METHODS FOR FUEL QUANTITY MEASUREMENT

(71) Applicant: Simmonds Precision Products, Inc., Vergennes, VT (US)

(72) Inventor: Philip Paul Buchwald, New Haven, VT (US)

(73) Assignee: Simmonds Precision Products, Inc., Vergennes, VT (US)

(*) Notice: Subject to any disclaimer, the term of this patent is extended or adjusted under 35 U.S.C. 154(b) by 616 days.

(21) Appl. No.: 17/957,884

(22) Filed: Sep. 30, 2022

(65) Prior Publication Data

US 2023/0122403 A1 Apr. 20, 2023

Related U.S. Application Data

(60) Provisional application No. 63/256,152, filed on Oct. 15, 2021.

(51) Int. Cl.
*G01F 22/02* (2006.01)
*B60K 15/03* (2006.01)

(52) U.S. Cl.
CPC ............. *G01F 22/02* (2013.01); *B60K 15/03* (2013.01); *B60K 2015/0319* (2013.01); *B60K 2015/03223* (2013.01)

(58) Field of Classification Search
CPC . G01F 22/02; B60K 15/03; B60K 2015/0319; B60K 2015/03223
USPC ...................................................... 73/114.38
See application file for complete search history.

(56) References Cited

U.S. PATENT DOCUMENTS

| | | | |
|---|---|---|---|
| 4,570,484 A | 2/1986 | Sokalski | |
| 4,671,106 A * | 6/1987 | Schroeder | ............... G01F 23/14 |
| | | | 73/438 |
| 6,931,926 B1 * | 8/2005 | Van Ee | ..................... G01N 9/28 |
| | | | 73/299 |
| 7,481,105 B2 | 1/2009 | Schillinger et al. | |
| 7,658,104 B2 | 2/2010 | Hewitt | |
| RE43,732 E | 10/2012 | Hedrick | |
| 10,435,170 B2 | 10/2019 | Carralero et al. | |

(Continued)

FOREIGN PATENT DOCUMENTS

DE 20022911 U1 * 6/2002 .......... A01M 7/0085

OTHER PUBLICATIONS

Translation of DE-20022911-U1 (Year: 2002).*

(Continued)

*Primary Examiner* — Nathaniel T Woodward
(74) *Attorney, Agent, or Firm* — Kinney & Lange, P.A.

(57) ABSTRACT

In accordance with at least one aspect of this disclosure, a fuel quantity measurement system includes, one or more pressure sensors are configured to operatively connect external to a fuel volume of a fuel tank, and can be operative to sense and output a signal indicative of a pressure outside of the fuel volume. One or more hollow pressure tubes can be configured to be disposed in the fuel volume in the fuel tank. The one or more hollow tubes can have a first end in fluid communication with the fuel volume and a second end configured to be sealed against an ambient environment external to the fuel tank. One or more temperature sensors can be configured to operatively connect within the fuel tank, operative to sense and output a signal indicative of a temperature of the fuel tank.

20 Claims, 1 Drawing Sheet

(56) References Cited

U.S. PATENT DOCUMENTS

| | | |
|---|---|---|
| 10,627,280 B2 | 4/2020 | Zakrzewski et al. |
| 2006/0260392 A1* | 11/2006 | Hedrick ................ G01F 23/165 |
| | | 702/55 |
| 2021/0096036 A1 | 4/2021 | Schulte et al. |
| 2021/0293590 A1 | 9/2021 | Gillespie |

OTHER PUBLICATIONS

Extended European Search Report issued by Examiner Bertrand Reeb, of the European Patent Office, dated Feb. 14, 2023, in corresponding European Patent Application No. 22201925.9.

Communication under Rule 71(3) EPC dated Feb. 10, 2025, for corresponding European Patent Application No. 22201925.9, 36 pgs.

* cited by examiner

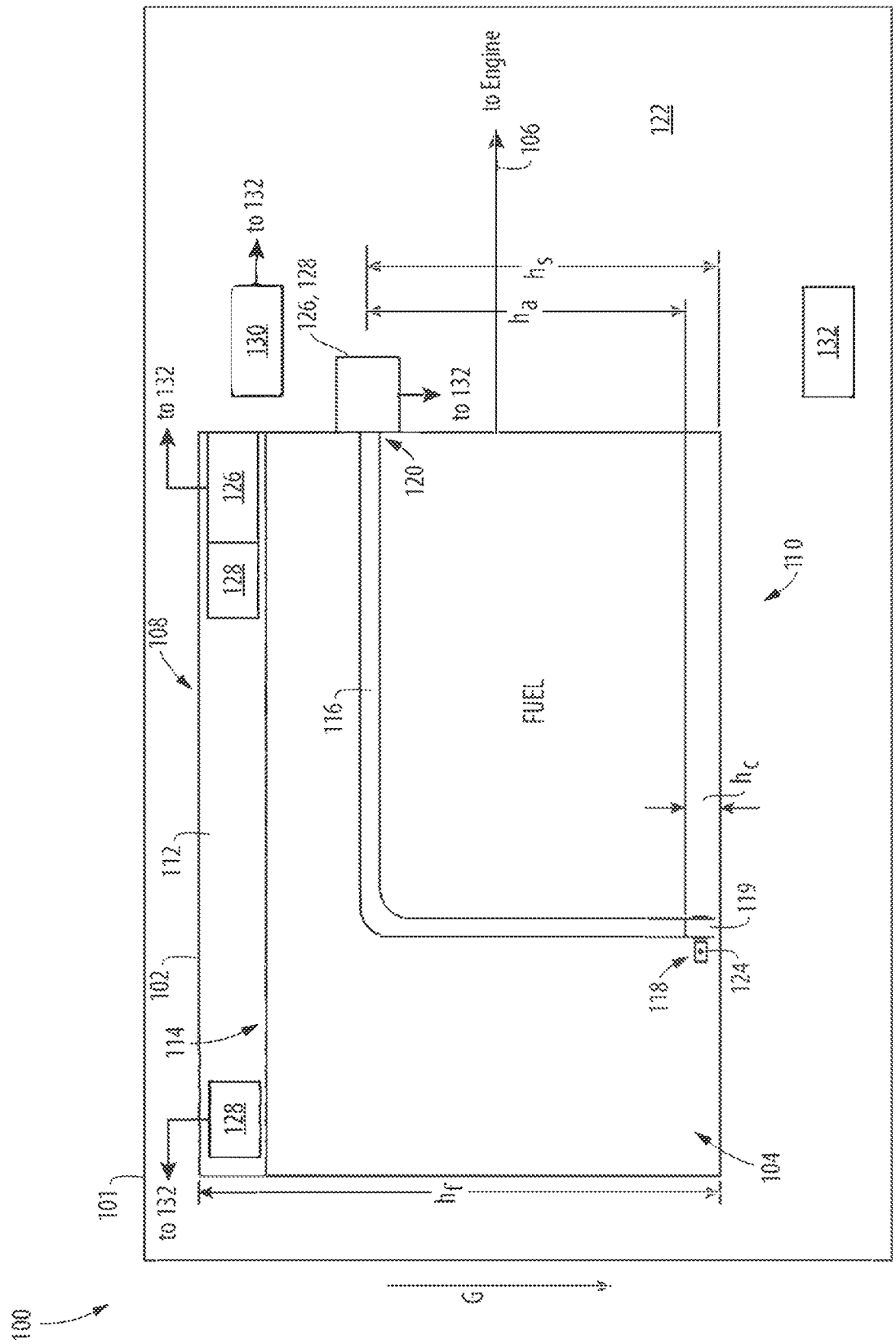

SYSTEMS AND METHODS FOR FUEL QUANTITY MEASUREMENT

CROSS-REFERENCE TO RELATED APPLICATIONS

This application claims priority to and the benefit of U.S. Provisional Patent Application No. 63/256,152, filed Oct. 15, 2021.

TECHNICAL FIELD

The present disclosure relates generally to fuel measurement systems, and in particular to measuring fuel quantity.

BACKGROUND

The precise measurement of fuel quantity, used to estimate energy available for operation of the aircraft engines, can be important for operational efficiency. Typically, measuring fuel quantity utilizes capacitive sensors to measure a height of fuel in the tank, combined with a capacitive compensator to measure the variance in fuel dielectric, and a densitometer to measure fuel density.

There is always a need in the art for improvements to fuel measurement systems in the aerospace industry, for example having improved accuracy while including fewer electronics.

SUMMARY

In accordance with at least one aspect of this disclosure, a fuel quantity measurement system includes, one or more pressure sensors are configured to operatively connect external to a fuel volume of a fuel tank, and can be operative to sense and output a signal indicative of a pressure inside of the fuel volume. One or more hollow pressure tubes can be configured to be disposed in the fuel volume in the fuel tank. The one or more hollow tubes can have a first end in fluid communication with the fuel volume and a second end configured to be sealed against an ambient environment external to the fuel tank. One or more temperature sensors can be configured to operatively connect within the fuel tank, operative to sense and output a signal indicative of a temperature of the fuel tank.

A module can include machine readable instructions configured to cause the module to estimate a quantity of the fuel volume using at least one of the signal indicative of the pressure inside of the fuel volume, the signal indicative of the pressure external to the fuel volume, and/or the signal indicative of the temperature of the fuel tank to calculate a free surface of the fuel volume, and calculate a corrected fuel pressure at the first end of the hollow pressure tube to account for at least one of a height of the one or more pressure sensors relative to a height of the first end of the hollow pressure tube from a bottom of the fuel tank, a compressibility of a fluid held within the hollow pressure tube, and/or a change in fuel volume in response to a change in temperature of the fuel tank.

In certain embodiment, the one or more pressure sensors can include a pressure sensor operatively connected within the fuel tank, operative to sense a static pressure of an ullage space when the fuel volume is at full-fuel. In certain embodiments, the one or more pressure sensors can include a pressure sensor operatively connected external to the fuel tank, operative to sense a pressure within the pressure tube at the second end of the pressure tube indicative of the fuel pressure at the first end of the hollow pressure tube. In certain such embodiments, the second end of the hollow pressure tube can be configured to be sealed against an ambient environment external to the fuel tank with the one or more pressure sensor operatively connected external to the fuel tank.

In certain embodiments, the one or more temperature sensors can include a temperature sensor operatively connected within an ullage space of the fuel tank, operative to sense a temperature of the ullage space. In certain embodiments, the one or more temperature sensors can be included within each of the one or more pressure sensors, and the one or more temperature sensors can be configured to sense and output signal indicative of a temperature within the hollow pressure tube.

The system can include a bracket configured to fix the first end of the hollow pressure tube is configured to closer to a bottom of the fuel tank than to the ullage space. In certain embodiments, a height from a center of the hollow pressure tube at the second end to the bottom of the fuel tank can be greater than a height from a center of the hollow pressure tube at the second end to a fuel head in the first end of the hollow pressure tube. In certain embodiments, a height of the fuel volume from the ullage space to the bottom of the fuel tank at full-fuel can be greater than both of the height from a center of the hollow pressure tube at the second end to the bottom portion of the fuel tank and the height from a center of the hollow pressure tube at the second end to the fuel head in the first end of the hollow pressure tube.

In embodiments, the one or more pressure sensors operatively connected external to the fuel tank can be disposed in the hollow pressure tube at the second end. In certain such embodiments, the height from a center of the hollow pressure tube at the second end to the bottom of the fuel tank can include a height from the one or more pressure sensors operatively connected external to the fuel tank to a bottom of the fuel tank.

In certain embodiments, the system can include one or more accelerometers configured to operatively connect to sense and output a signal indicative of at least one of an acceleration, yaw, pitch, and/or roll vectors of the fuel tank. In certain such embodiments, the machine readable instructions can be configured to determine a fuel pressure at the first end of the hollow pressure tube based at least in part on the signal indicative of the at least one of acceleration, yaw, pitch, and/or roll vectors, and calculate a corrected fuel pressure at the first end of the hollow pressure tube to account for at least one of: acceleration, yaw, pitch, and/or roll.

In certain embodiments, at least one of the one or more pressure sensors can include at least one of an optical sensors and/or an optically powered MEMs based sensors. In certain embodiments, the hollow pressure tube can contain a common fluid to the ambient environment external to the fuel tank. In certain embodiments, the hollow pressure tube can contain air. In embodiments, the system can include the fuel tank and a fuel supply line configured to supply fuel from the fuel volume to an engine. In certain such embodiments, the hollow tube can be fluidly isolated from the fuel supply line.

In accordance with at least one aspect of this disclosure, a non-transitory computer readable medium can include machine readable instructions configured to cause a computer to execute a method. The method can include transmitting a signal indicative of a hydrostatic fuel pressure at a first end of a hollow pressure tube disposed in a fuel volume of a fuel tank to one or more remote pressure sensors at a second end of the hollow pressure tube to estimate a quantity of fuel in the fuel tank.

In embodiments, the method can include estimating a quantity of the fuel volume using at least one of: a signal indicative of the hydrostatic pressure inside of the fuel volume at the first end of the hollow pressure tube, a signal indicative of the pressure external to the fuel volume, and/or a signal indicative of the temperature of the fuel tank to calculate a free surface of the fuel volume, and calculating a corrected fuel pressure at the first end of the hollow pressure tube to account for at least one of: a height of one or more pressure sensors relative to a height of the first end of the hollow pressure tube from a bottom of the fuel tank, a compressibility of a fluid held within the hollow pressure tube, and/or a change in fuel volume in response to a change in temperature of the fuel tank.

In embodiments, the method can include determining the hydrostatic fuel pressure at the first end of the hollow pressure tube based at least in part on a signal indicative of at least one of acceleration, yaw, pitch, and/or roll vectors, calculating a corrected fuel pressure at the first end of the hollow pressure tube to account for at least one of acceleration, yaw, pitch, and/or roll.

In accordance with at least one aspect of this disclosure, a method includes transmitting a signal indicative of a hydrostatic fuel pressure at a first end of a hollow pressure tube disposed in a fuel volume of a fuel tank to one or more remote pressure sensors at a second end of the hollow pressure tube to determine a quantity of fuel in the fuel tank. In embodiments, the method can include estimating a quantity of the fuel volume using at least one of: a signal indicative of the hydrostatic pressure inside of the fuel volume at the first end of the hollow pressure tube, a signal indicative of the pressure external to the fuel volume, and/or a signal indicative of the temperature of the fuel tank to calculate a free surface of the fuel volume, and calculating a corrected fuel pressure at the first end of the hollow pressure tube to account for at least one of a height of one or more pressure sensors relative to a height of the first end of the hollow pressure tube from a bottom of the fuel tank, a compressibility of a fluid held within the hollow pressure tube, and/or a change in fuel volume in response to a change in temperature of the fuel tank.

In certain embodiments, the method can further include, determining the hydrostatic fuel pressure at the first end of the hollow pressure tube based at least in part on a signal indicative of at least one of acceleration, yaw, pitch, and/or roll vectors, and calculating a corrected fuel pressure at the first end of the hollow pressure tube to account for at least one of acceleration, yaw, pitch, and/or roll.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGURES, wherein:

FIG. 1 is a schematic diagram of a fuel tank in accordance with this disclosure, showing; a system for measuring fuel quantity.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are described herein.

In accordance with at least one aspect of this disclosure, a fuel quantity measurement system 100 can include, a fuel tank 102 configured to supply fuel from a fuel volume 104 via a fuel supply line 106 to an engine of a vehicle 101 (e.g., an aircraft). The fuel tank 102 can have a top 108 and a bottom 110 opposite the top in the direction of gravity G while the vehicle 101 is grounded. An ullage space 112 can be defied between a top surface 114 of the fuel volume 104 and the top of the fuel tank 102 when the fuel tank 102 is at full-fuel and the vehicle 101 is grounded.

One or more hollow pressure tubes 116 (e.g., one is shown in FIG. 1) can be configured to be disposed in the fuel volume 104 within the fuel tank 102. The one or more hollow pressure 116 tubes can have a first end 118 in fluid communication with the fuel volume 104 (e.g. an open end configured to receive a head 119) and a second end 120 configured to be sealed against an ambient environment 122 external to the fuel tank 102. While the hollow pressure tube 116 can take any suitable shape or form, for example to account for surrounding vehicle architecture, the first, open end 118 of the hollow pressure tube 116 should be oriented facing towards the bottom 110 of the tank 102 so that fuel is unable to flow through the hollow pressure tube 116, with the exception of the small head 119.

In certain embodiments, the hollow pressure tube 116 can contain a common fluid to the ambient environment 122 external to the fuel tank. For example, in certain embodiments, the hollow pressure tube 116 can contain ambient air. The hollow pressure tube 116, while being disposed in the fuel volume 104, is fluidly isolated from the fuel supply line 106 and does not contribute to the supply of fuel to the engine.

The system 100 can include a bracket 124, or other stabilizer, configured to fix the first end 118 of the hollow pressure tube 116 near the bottom 110 of the fuel tank 102. The first end 118 of the hollow pressure tube 116 is therefore fixed in place at a location that is closer to the bottom 110 of the fuel tank 102 than to the ullage space 112. In certain embodiments, a height from a center of the hollow pressure tube 116 at the second end 120 to the bottom 110 of the fuel tank 110, e.g., Hs, can be greater than a height from a center of the hollow pressure tube 116 at the second end 120 to the top of the head 119 in the hollow pressure tube 116, e.g., Ha. In certain embodiments, a height of the fuel volume 104 from the ullage space 112 to the bottom 110 of the fuel tank 102 at full-fuel, e.g., Hf, can be greater than both of the height Ha and the height Hs.

The system can further include a plurality of sensors operatively connected to, within, and/or surrounding the fuel tank 102. In embodiments, the plurality of sensors can include one or more pressure sensors 126 configured to operatively connect external to the fuel volume 104. At least one of the one or more pressure sensors 126 can include at least one of an optical sensor and/or Micro Electro-Mechanical System (MEMs) based sensors. Any suitable sensor is contemplated herein, for example sensors that do not require electrical connections within the fuel tank. The one or more pressure sensors 126 are operative to sense, at respective locations, and output a signal indicative of a pressure outside of the fuel volume 104 at the respective location. In embodiments, the one or more pressure sensors 126 can include a pressure sensor located at the first, open end 118 of the hollow pressure tube 116, where the pressure sensor 126 can be positioned as low as practicable (e.g., within a few inches) to the bottom of the fuel tank 102 (e.g., where a height of the head 119 is height Hc).

In certain embodiments, the one or more pressure sensors 126 can include a pressure sensor operatively connected within the fuel tank 102, operative to sense a static pressure of the ullage space 112 when the fuel volume 104 is at full-fuel. In certain embodiments, the one or more pressure sensors 126 can include a pressure sensor operatively connected external to the fuel tank 102, operative to sense a pressure within the hollow pressure tube 116 at the second end 120 of the hollow pressure tube 116 (e.g., via a diaphragm). In this case, the second end 120 of the hollow pressure tube 116 can be sealed against the ambient environment 122 external to the fuel tank 102 with the one or more pressure sensors 126.

In embodiments where the one or more pressure sensors 126 include a pressure sensor connected external to the fuel tank 102 and disposed in or on the second end 120 of the hollow pressure tube 116, the height Hs, can represent the height from the one or more pressure sensors 126 operatively connected external to the fuel tank 102 to the bottom 110 of the fuel tank 102.

The plurality of sensors can further include one or more temperature sensors 128 configured to operatively connect within the fuel tank 102. The one or more temperature sensors 128 are operative to sense, at respective locations, and output a signal indicative of a temperature of the fuel tank at the respective location. In certain embodiments, the one or more temperature sensors 128 can include a temperature sensor operatively connected within the ullage space 112 of the fuel tank 102, operative to sense a temperature of the ullage space 112. In certain embodiments, the one or more temperature sensors 128 can be included within each of the one or more pressure sensors 126, and the one or more temperature sensors 128 can be configured to sense and output signal indicative of a temperature within the hollow pressure tube 116.

Any suitable location for the one or more pressure sensors 126 and/or temperature sensors 128 can be used, for example the respective locations as described herein, or any other location as appreciated by those having ordinary skill in the art. Any suitable combination of pressure and temperature sensors 126, 128 is contemplated herein, for example, in embodiments, the respective locations of the one or more temperature sensors 128 can be the same respective locations as the one or more pressure sensors 126 (e.g., the one or more temperature sensors 128 can be integral with the one or more pressure sensors 126). In certain embodiments, the one or more temperature sensors 128 can be remote to the one or more pressure sensors 126, to sense temperatures at respective locations different than the one or more pressure sensors 126.

In certain embodiments, the plurality of sensors can include one or more accelerometers 130 configured to operatively connect to sense and output a signal indicative of at least one of an acceleration, yaw, pitch, and/or roll vectors of the aircraft 101 and/or the fuel volume 104 and/or the fuel tank 102. In certain embodiments, system accuracy requirements may require additional accelerometers 130 for improved accuracy.

The system 100 can include a module 132 having machine readable instructions configured to cause the module 132 to determine a fuel pressure at the first end 118 of the hollow pressure tube 116 based at least in part the signal indicative of the pressure outside of the fuel volume 104, and/or the signal indicative of the temperature of the fuel tank 10. The machine readable instructions can also cause the module 132 to calculate a corrected fuel pressure at the first end 118 of the hollow pressure tube 116 to account for at least one of a height of the one or more pressure sensors 126 (e.g., Hs) relative to a height of the head 119 from the bottom 110 of the fuel tank 102 (e.g., Hc), a compressibility of a fluid held within the hollow pressure tube 116, and/or a change in fuel volume 104 in response to a change in temperature of the fuel tank 102. With the corrected pressure calculation, the module 132 can estimate a quantity of the fuel volume using at least one of the signal indicative of the pressure inside the fuel volume 104, the signal indicative of the pressure external to the fuel volume 104, and/or the signal indicative of the temperature of the fuel tank 102 to calculate a plane of the free surface of the fuel volume 104. From the free surface plane, quantity of fuel within the fuel tank 102 (e.g., volume and/mass) can be determined. As described, three sensors 126 at three different locations may be used to calculate the plane of the free surface, for example, the sensor 126 sensing the pressure within the fuel volume 104, and at least two sensors 126 sensing the pressure outside of the fuel volume 104 (e.g., in the ullage space 112).

In embodiments, the machine readable instructions can also be configured to cause the module 132 to determine a fuel pressure at the first end 118 of the hollow pressure tube 116 based at least in part on the signal indicative of the at least one of acceleration, yaw, pitch, and/or roll vectors, and calculate a corrected fuel pressure at the first end 118 of the hollow pressure tube 116 to account for at least one of acceleration, yaw, pitch, and/or roll of the vehicle 101.

In accordance with at least one aspect of this disclosure, a non-transitory computer readable medium can include machine readable instructions configured to cause a computer to execute a method. In embodiments, the method can include transmitting a signal indicative of a hydrostatic fuel pressure at a first end (e.g., end 118) of a hollow pressure tube (e.g., tube 116) disposed in a fuel volume (e.g., volume 104) of a fuel tank (e.g., fuel tank 102) to one or more remote pressure sensors (e.g., sensor(s) 126) at a second end of the hollow pressure tube to determine a quantity of fuel in the fuel volume.

In embodiments, the method can include determining the hydrostatic fuel pressure at the first end of the hollow pressure tube based at least in part on a signal indicative of a pressure outside of the fuel volume, and/or a signal indicative of a temperature of a fuel tank (e.g., with one or more temperature sensors 128), calculating a corrected fuel pressure at the first end of the hollow pressure tube to account for at least one of: a height of one or more pressure sensors (e.g., height Hs) relative to a height of a head 119 in the first end hollow pressure tube from a bottom of the fuel tank, (e.g., height Hc), a compressibility of a fluid held within the hollow pressure tube, and/or a change in fuel volume in response to a change in temperature of the fuel tank. The method can also include estimating a quantity of the fuel volume using at least one of: the signal indicative of the hydrostatic pressure inside of the fuel volume at the first end of the hollow pressure tube, the signal indicative of the pressure external to the fuel volume, the signal indicative of the temperature of the fuel tank to calculate a free surface of the fuel volume, and/or the corrected hydrostatic fuel pressure.

In embodiments, the method can include determining the hydrostatic fuel pressure at the first end of the hollow pressure tube based at least in part on a signal indicative of at least one of acceleration, yaw, pitch, and/or roll vectors (e.g., with one or more accelerometers 130), and calculating a corrected fuel pressure at the first end of the hollow pressure tube to account for at least one of acceleration, yaw, pitch, and/or roll. In accordance with at least one aspect of this disclosure, a method for determining fuel quantity in a fuel tank can include any suitable method as shown and described herein.

A pressure-based approach to fuel quantity estimation, where the fuel mass is estimated based on measurement of the hydrostatic pressure created at the bottom of the column of fuel which is present in the fuel tank, can utilize optical sensors or optically powered MEMs based sensors. Not only can optically based sensors improve the safety of fuel quantity estimation systems, by reduce the amount of electrical energy in the fuel tank, such optical systems can achieve accuracy on par or better that conventional systems, with less sensors altogether. Decreasing sensor count can also reduce installation cost and weight.

Embodiments include systems and methods to transmit the hydrostatic pressure from a location at the bottom of the fuel tank to a pressure sensor which is located external to the fuel tank. Advantages of embodiments can include transmitting pressure data with fluid from within a fuel tank to a transducer that is fully outside the tank rather than using pressure sensing elements used in both optically powered and traditional "copper wire" powered MEMs inside the tank. In certain embodiments, optics may be used to measure pressure directly in the outside-tank pressure transducer. Remote pressure sensing systems and methods as provided herein can allow for the use of the mature "copper wire" powered pressure transducers, while at the same time allowing a transition to optically powered or pure optical pressure transducers as the field of optics continues to progress.

Embodiments can include pressure sensors located externally to the fuel tank, hollow tubes that can port pressure to the sensors, any suitable sensor(s) that can measure the static pressure inside of the tank above the free surface of the fuel at full-tank fuel height, temperature sensor(s) that can measure the temperature of the fuel tank and accelerometers to measure an acceleration of the fuel tank (e.g., the acceleration of a vehicle in which the fuel tank is located). In certain embodiments, the temperature sensor(s) can be incorporated into each pressure sensor at the sensing element location so that the air temperature inside the hollow pressure tube may be accurately measured. If the temperature sensor is not located within the pressure sensor, it can be located as close as practicable to the interface between the tube and the pressure sensor so that the temperature of the fluid column inside of the tube may be measured as accurately as possible.

In certain embodiments, the accelerometers, or additional accelerometers or gyrometers, can be configured to measure the pitch and yaw (roll) vectors, for example if a particular system accuracy requirements make such measurements necessary. Acceleration vectors (as discussed further below) can influence the sensed pressure at the tube inlet port. For example, the lateral and longitudinal placement of the sensor, relative to the tube inlet port, could account for height differences which would be caused by pitch and roll.

Embodiments can include a hollow dead-ended pressure transmitting tube in the fuel quantity measurement system, where the hollow tube which can be fixed to a desired location at the bottom of the fuel tank and can be open to the fuel pressure at that fixed location. The opposite end of the hollow tube can be attached to, and sealed against leakage by, a pressure sensor, which can be located outside of the space which contains the fuel. In embodiments, the pressure sensor may be located either directly on the external wall of the fuel tank or at any remote location that is convenient for the given fuel tank and vehicle architecture.

In embodiments, a sensed pressure correction may be required due to the remotely located pressure sensor. For example, because the hollow tube is open to fuel at the bottom of the fuel column, and closed at the interface between the tube and the pressure sensor, the pressure measured by the sensor at the tube opening can be affected by, height of pressure sensor relative to the height of the open port at the bottom of the tube, the compressibility of the fluid (e.g., air) inside of the tube and/or volume changes due to temperature variation, as explained below with reference to example.

In certain cases, a correction calculation may be made to account for the difference between the hydrostatic pressure sensed at the sensor and that which is present at the bottom of the fuel column at the location of the open end of the hollow tube. If realized, this pressure difference can be due to the density of the fluid (in certain conditions, fuel) inside of the tube, and the vertical height of the fluid column between the fuel at the tube inlet and the senor. The correction can be represented as an available closed-form calculation which follows the equation:

$$\text{Sensed Pressure} = Q_f g h_f - Q_f g h_c - Q_a g h_a$$

where, $Q_f$ is the density of fuel (slugs/in$^2$, kg/m$^2$), $h_f$ is the height of fuel column inside of tank at tube inlet port location (inches, meters), $H_c$ is the height of fuel column inside of tube (inches, meters)—will be addressed in the following section, $Q_a$ is the density of air (slugs/in$^2$, kg/m$^2$), and $h_a$ is the height of the air column (inches, meters).

Because the fluid inside of the tube may be compressible, the height of the fuel's free surface inside of the tube will vary by $H_c$ (e.g., as indicated in FIG. 1) as the hydrostatic pressure at the bottom of the fuel tank increases or decreases. As shown above, the change in height of the fluid column can, in most cases, result in a negligible error. However, because the density of the fuel is much greater, the pressure at the fuel's free surface inside of the tube will differ from the hydrostatic pressure at the tube inlet port by the value of: $-Q_f g h_c$.

This variation is not negligible (due to the fuel density), and therefore should be accounted for. The error due to compressibility of the fluid inside the tube may be corrected by closed form equations, which may be solved for the sensed pressure. In this case, the correction may be applied if the volume of the pressure tube is known. The height $H_c$ varies by the amount that the fluid inside the tube changes volume. The fluid volume change (at constant temperature) is a function of initial tube volume, hydrostatic pressure at the tube inlet port, and hydrostatic pressure loss along height $H_c$. Height $H_c$, in turn is a function of the internal tube volume change. Therefore, calculating $H_c$ is an iterative process, however it is nonetheless deterministic, based on known variables.

As temperature varies, the volume of fluid inside of the tube will vary, and in turn, so will $H_c$. This may be corrected for by the ideal gas law: $V_2/V_1=T_1/T_2$. Therefore, a temperature reference is required by the system, so embodiments can include any number of temperature sensors.

In certain embodiments, errors in sensed pressure may be realized due to pitch and roll where the sensors are longitudinally/laterally displaced. While the corrected pressure calculation shows that the error due to vertical displacement of the sensor relative to the tube inlet port can be minor, such a measurement can be corrected for using the same equation when the sensor is located at the same lateral position as the tube inlet port under constant pitch conditions. When variable pitch attitudes combined with longitudinal displacement of the sensor, or variable roll attitudes combined with lateral (aircraft span-wise) displacement of the sensor occur, the pitch/roll combined with the displacement will result in a variable vertical height of the sensor relative to the tube inlet port height. In certain embodiments, for example where accuracy considerations require correction for the sensor relative height, accelerometer and/or gyrometer inputs can be included in the calculations which will provide the pitch and roll information to make such corrections.

In addition to the pitch and roll effects, aircraft acceleration normal to the plane of the fuel free surface must be accounted for. This is due to the "g" term in each of the correction equations. Therefore, an accelerometer must be incorporated into the system to account for normal acceleration.

In embodiments, it may be necessary or desired to update the hollow tube internal pressure data. The non-compressed pressure inside of each tube (the pressure which would be present if $H_c$ was zero) should be a known value. Therefore, it may be advantageous for this known internal pressure be updated when the pressure sensed by the particular tube-sensor pair is within a specified range from the in-tank static pressure which is measured by the pressure sensor, located above the full-fuel free surface. The corrections for $H_c$ and hydrostatic pressure loss in the fluid column (e.g., as described above) can then made using the updated static pressure as a known variable.

Embodiments can remove electrical components, such as capacitors, from within a fuel tank, to improve the safety of the fuel quantity measurement system. Embodiments can utilize optical pressure sensors, for example an optical cable having photosensor, which can also allow for the removal of copper wires from within the fuel tank. In certain cases, optical system may require accurate aiming for the lasers, which can be challenging. However, embodiments improve upon such systems, as embodiments do not require the exact alignment and focusing of multiple mirrors upon the photosensor.

Embodiments can measure the pressures, the ambient pressure, a pressure of the ullage space, a pressure of the fuel at the open end of the hollow tube, and a pressure of the fluid inside the hollow tube. These pressures can be used to calculate the height of the fuel at the location of each of the pressure sensors, which can be used to calculate the free surface of the fuel in the tank, to determine the total quantity of fuel within the tank.

The diameter of the hollow tube can be sized to prevent entrainment of the fuel through the hollow tube (e.g., at least 6.35 mm or 0.25 inches), for example through capillary action. In certain embodiments, the hollow tube can have an L-shape (e.g., as shown), where the ratio of horizontal length to vertical length can be about 1.66 (e.g., a vertical length of about 915 mm or 36 inches, and horizontal lengths of about 1525 mm or 60 inches), however the relative size of the hollow pressure tube can be adjusted as needed to fit a given system. For example, the diameter of the hollow pressure tube, size, and/or proportions may be configured and/or adjusted as needed to fit an existing fuel tank and surrounding architecture. In embodiments, the hollow tube can be an entirely vertical tube, at least a portion of the hollow tube could hang over a rear spar, or the shape of the hollow tube could be designed in accordance with a specific vehicle (e.g., an aircraft), the location of the fuel tank, or the shape of the fuel tank. In embodiments, the horizontal portion of the hollow tube (e.g., as shown in the FIGURES) can be straight or non-straight to accommodate additional architecture as needed or desired.

In embodiments, the system can be designed so that even if fuel were to enter the hollow tube beyond the head, for example into the horizontal portion, the fuel would seek its own height, so any pressure readings within the tube should not be affected. In embodiments, if the system experiences turbulence, shaking, or other movement that may jostle the fuel in the fuel tank, the system can be designed such that effects on the readings would be negligible. Those having ordinary skill in the art would appreciate and understand how to design and tune the system accordingly without undue experimentation.

In certain embodiments, the fluid within the hollow tube may not be air. For example, other inert gases may be used, such as nitrogen or argon. In certain cases, the fluid in the hollow tube can be the same as either of the fluid filling the ullage space and/or the ambient environment external to the fuel tank. In embodiments, the ullage space can be inert, however, because embodiments remove the electronic components from the fuel tank, an inert ullage space is not required, therefore ambient air may be used. It will be appreciated by those having ordinary skill in the art that changing the fluid in the hollow tube and/or ullage space would change the density of such fluids, which should be accounted for in the correction equations as presented above.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A fuel quantity measurement system, comprising:
a first pressure sensor operatively connected external to a liquid fuel volume of a fuel tank, operative to sense and output a signal indicative of a pressure inside of the liquid fuel volume and a pressure of an ambient environment external to and surrounding the fuel tank;
a hollow pressure tube configured to be disposed in the liquid fuel volume, the hollow pressure tube having a first end in fluid communication with the liquid fuel volume and a second end configured to be sealed against the ambient environment external to and surrounding the fuel tank by the first pressure sensor;
a first temperature sensor operatively connected within the fuel tank, operative to sense and output a signal indicative of a temperature of the fuel tank; and
a module including machine readable instructions configured to cause the module to:
estimate a quantity of the fuel volume using at least one of the signal indicative of the pressure inside of the fuel volume, the signal indicative of the pressure external to the fuel volume, and the signal indicative of the temperature of the fuel tank to calculate a free surface of the fuel volume; and
calculate a corrected fuel pressure at the first end of the hollow pressure tube to account for at least one of: a height of the first pressure sensor relative to a height of the first end of the hollow pressure tube from a bottom of the fuel tank, a compressibility of a fluid held within the hollow pressure tube, and a change in fuel volume in response to a change in temperature of the fuel tank.

2. The system as recited in claim 1, further comprising a second pressure sensor operatively connected within the fuel tank, operative to sense a static pressure of an ullage space when the fuel volume is at full-fuel.

3. The system as recited in claim 2, further comprising a bracket configured to fix the first end of the hollow pressure tube closer to a bottom of the fuel tank than to the ullage space, wherein a height from a center of the hollow pressure tube at the second end to the bottom of the fuel tank is greater than a height from a center of the hollow pressure tube at the second end to a fuel head in the first end of the hollow pressure tube.

4. The system as recited in claim 3, wherein a height of the fuel volume from the ullage space to the bottom of the fuel tank at full-fuel is greater than both of the height from a center of the hollow pressure tube at the second end to the bottom portion of the fuel tank and the height from a center of the hollow pressure tube at the second end to the fuel head in first end of the hollow pressure tube.

5. The system as recited in claim 3, wherein the first pressure sensor operatively connected external to the fuel tank is disposed in the hollow pressure tube at the second end, wherein the height from a center of the hollow pressure tube at the second end to the bottom of the fuel tank includes a height from the first pressure sensor operatively connected external to the fuel tank to a bottom of the fuel tank.

6. The system as recited in claim 1, wherein the first pressure sensor is operatively connected external to the fuel tank, operative to sense a pressure within the pressure tube at the second end of the pressure tube indicative of the fuel pressure at the first end of the hollow pressure tube.

7. The system as recited in claim 6, wherein the second end of the hollow pressure tube is configured to be sealed against the ambient environment external to and surrounding the fuel tank with the first pressure sensor operatively connected external to the fuel tank.

8. The system as recited in claim 1, wherein the first temperature sensor is operatively connected within an ullage space of the fuel tank, and operative to sense a temperature of the ullage space.

9. The system as recited in claim 1, further comprising a second temperature sensor included within the first pressure sensor, wherein the second temperature sensor is configured to sense and output a signal indicative of a temperature within the hollow pressure tube.

10. The system as recited in claim 1, further comprising, one or more accelerometers configured to operatively connect to sense and output a signal indicative of at least one of: an acceleration, yaw, pitch, and roll vectors.

11. The system as recited in claim 10, wherein the machine readable instructions are configured to cause the module to:
determine a fuel pressure at the first end of the hollow pressure tube based at least in part on the signal indicative of the at least one of: acceleration, yaw, pitch, and roll vectors; and
calculate a corrected fuel pressure at the first end of the hollow pressure tube to account for at least one of: acceleration, yaw, pitch, and roll.

12. The system as recited in claim 1, wherein the first pressure sensor includes at least one of an optical sensors and an optically powered MEMs based sensors.

13. The system as recited in claim 1, wherein the hollow pressure tube contains a common fluid to the ambient environment external to and surrounding the fuel tank.

14. The system as recited in claim 1, further comprising, the fuel tank and a fuel supply line, wherein the hollow pressure tube is fluidly isolated from the fuel supply line.

15. A non-transitory computer readable medium including machine readable instructions configured to cause a computer to execute a method, the method comprising:
transmitting a signal indicative of a hydrostatic fuel pressure at a first end of a hollow pressure tube disposed in a liquid fuel volume of a fuel tank to one or more remote pressure sensors at a second end of the hollow pressure tube to estimate a quantity of the fuel volume in the fuel tank; and
calculating a corrected fuel pressure at the first end of the hollow pressure tube to account for at least one of: a height of one or more pressure sensors relative to a height of the first end of the hollow pressure tube from a bottom of the fuel tank, a compressibility of a fluid held within the hollow pressure tube, and a change in fuel volume in response to a change in temperature of the fuel tank;
wherein the second end of the hollow pressure tube is configured to be sealed against an ambient environment external to and surrounding the fuel tank by a pressure sensor of the one or more remote pressure sensors, the pressure sensor at the second end of the hollow pressure tube configured to sense a pressure of the ambient environment external to and surrounding the fuel tank.

16. The non-transitory computer readable medium as recited in claim 15, wherein the method further includes:
estimating a quantity of the fuel volume using at least one of: a signal indicative of the hydrostatic pressure inside of the fuel volume at the first end of the hollow pressure tube, a signal indicative of the pressure external to the fuel volume, and a signal indicative of the temperature of the fuel tank to calculate a free surface of the fuel volume.

17. The non-transitory computer readable medium as recited in claim 16, wherein the method further includes:

determining the hydrostatic fuel pressure at the first end of the hollow pressure tube based at least in part on a signal indicative of at least one of: acceleration, yaw, pitch, and roll vectors; and calculating a corrected fuel pressure at the first end of the hollow pressure tube to account for at least one of: acceleration, yaw, pitch, and roll.

18. A method, comprising:

transmitting a signal indicative of a hydrostatic fuel pressure at a first end of a hollow pressure tube disposed in a liquid fuel volume of a fuel tank to one or more remote pressure sensors at a second end of the hollow pressure tube to determine a quantity of the fuel volume in the fuel tank; and calculating a corrected fuel pressure at the first end of the hollow pressure tube to account for at least one of: a height of one or more pressure sensors relative to a height of the first end of the hollow pressure tube from a bottom of the fuel tank, a compressibility of a fluid held within the hollow pressure tube, and a change in fuel volume in response to a change in temperature of the fuel tank;

wherein the second end of the hollow pressure tube is configured to be sealed against an ambient environment external to and surrounding the fuel tank by a pressure sensor of the one or more remote pressure sensors, the pressure sensor at the second end of the hollow pressure tube configured to sense a pressure of the ambient environment external to and surrounding the fuel tank.

19. The method as recited in claim 18, further comprising:

estimating a quantity of the fuel volume using at least one of: a signal indicative of the hydrostatic pressure inside of the fuel volume at the first end of the hollow pressure tube, a signal indicative of the pressure external to the fuel volume, and a signal indicative of the temperature of the fuel tank to calculate a free surface of the fuel volume.

20. The method as recited in claim 19, further comprising:

determining the hydrostatic fuel pressure at the first end of the hollow pressure tube based at least in part on a signal indicative of at least one of: acceleration, yaw, pitch, and roll vectors; and calculating a corrected fuel pressure at the first end of the hollow pressure tube to account for at least one of: acceleration, yaw, pitch, and roll.

* * * * *